United States Patent Office 3,069,236
Patented Dec. 18, 1962

3,069,236
METHOD FOR THE PREPARATION OF DIBORANE
Robert D. Schultz, East Whittier, and Carl L. Randolph, Jr., Whittier, Calif., assignors to Aerojet-General Corporation, Azusa, Calif., a corporation of Ohio
No Drawing. Filed Mar. 10, 1955, Ser. No. 493,569
4 Claims. (Cl. 23—204)

This invention relates to a new and improved method of preparing diborane.

Diborane is an excellent high energy fuel. Unfortunately, however, its use has been severely limited due to a lack of a convenient and inexpensive method for preparing it in high yield.

Heretofore, diborane has been prepared by reacting alkali metal borohydrides with hydrogen chloride gas at room temperature or with liquid hydrogen chloride at a temperature of −78° C. These methods are very slow, requiring reaction times of from 16 to 24 hours. In addition, the separation of diborane from the resulting 70% diborane–30% hydrogen chloride azeotropic mixture is very difficult.

It has long been desired as a matter of cost, convenience and commercial feasibility, to produce diborane by using sulfuric acid as the protolyzing acid, preferably at room temperature. Unfortunately, when alkali-metal borohydrides were reacted with concentrated sulfuric acid, instead of diborane, boron oxides were produced with explosive violence. In an attempt to avoid oxidation, dilute sulfuric acid was substituted in the reaction. Although the borohydride-dilute sulfuric acid reaction was not explosive, hydrolysis occurred producing boric acid instead of diborane.

We have now found that diborane is rapidly and safely produced in good yield by reacting a metal borohydride with concentrated sulfuric or chlorosulfonic acid, in the presence of a polycyclic aromatic quinone or polycyclic aromatic quinone sulfonic acid, and their corresponding salts, in accordance with the general reaction scheme set forth below:

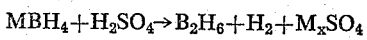

$$MBH_4 + H_2SO_4 \rightarrow B_2H_6 + H_2 + M_xSO_4$$

wherein M is a metal radical. Due to the non-volatile characteristic of sulfuric acid, an azeotropic mixture of gases is avoided. Although rapid, the reaction proceeds smoothly and gently without sparking, flaming or explosions.

As a matter of convenience, alkali and alkaline earth metal borohydrides such as potassium and lithium borohydride are usually employed as starting materials. Commercial grade sulfuric acid, ordinarily containing from about 95% to about 98% by weight pure hydrogen sulfate and about 5% to about 2% by weight water can be used as the protolyzing acid. Chlorosulfonic acid decomposes in water and therefore it is preferred that the system by anhydrous when this acid is employed. Mixtures of chlorosulfonic and sulfuric acid may also be used if desired.

Polycyclic quinones such as the naphthaquinones, the anthraquinones, and the phenanthraquinones, polycyclic aromatic quinone sulfonic acids such as the naphthaquinone sulfonic acids, anthraquinone sulfonic acids, and phenanthraquinone sulfonic acids, and their alkali and alkaline earth metal salts, as well as mixtures of such polycyclic quinones, are all useful as moderators in this invention.

In accordance with the present invention, sulfuric or chlorosulfonic acid containing a polycyclic aromatic quinone, polycyclic aromatic quinone sulfonic acid or a corresponding salt of the sulfonic acid, usually in an amount of from about 2% to about 10% by weight of the sulfuric acid, is reacted with a metal borohydride and diborane gas is evolved. The preferred method of conducting the reaction is to dissolve the polycyclic aromatic hydrocarbon or anhydride in the sulfuric or chlorosulfonic acid, heating if necessary to effect solution. The reaction is usually conducted in a reactor equipped with a gas outlet leading to a low temperature trap. The acid solution is placed in the reactor and finely divided borohydride added with agitation. During the course of the reaction, a gentle evolution of hydrogen and diborane gases takes place. These gases are vented through the gas outlet and collected in the low temperature trap. If desired, the reaction can also be conducted in vacuum or a nitrogen atmosphere as well as in air.

The mechanism by which these polycyclic compounds modify the sulfuric or chlorosulfonic acid-borohydride reaction has not been definitely established. It is believed, however, that these compounds reduce the surface tension of the protolyzing acid and form a coating about the borohydride particles. The reactants diffuse into this coating. In addition, bisulfate ions, produced by the dissociation of the protolyzing acid, become concentrated in the coating, thus providing a buffer in the reaction zone. By diffusion of the reactants and buffering of the reaction, the protolysis of the borohydride yielding diborane takes place without accompanying oxidation which produces boron oxides, or hydrolysis which produces boric acid.

To more clearly illustrate this invention, the following examples are presented. It is to be understood, however, that these examples are presented merely as a means of illustration, and are not intended to limit the scope of the invention in any way.

EXAMPLE I

*Anthraquinone Moderation*

Anthraquinone in an amount of 10% by weight of the acid mixture was dissolved in concentrated sulfuric acid. A 1 cc. sample of the solution was placed in a standard test tube into which was dropped an 8-mesh crystal of sodium borohydride. A gent e evolution of gas occurred and diborane was identified by its infrared spectrum. During the reaction, the color of the solution changed from orange to dark green-brown.

EXAMPLE II

*2-Anthraquinone Sulfonic Acid Salt Moderation*

2-anthraquinone sulfonic acid sodium salt in an amount of 10% by weight of the acid mixture was dissolved in concentrated sulfuric acid. A 1 cc. sample of the solution was placed in a standard test tube into which was dropped an 8-mesh crystal of sodium borohydride. A gentle evolution of gas occurred and diborane was identified by its infrared spectrum.

Optimum results are obtained by first dissolving the modifier in the protolyzing acid and subsequently adding the metal borohydride to the solution. This procedure provides a homogeneous reaction mixture in which maximum protection of the metal borohydride particles from the oxidizing influence of the protolyzing acid is obtained as well as maximum surface area for reaction. It is often desirable to heat the modifier-protolyzing acid mixture to effect solution, however, the temperature at which the diborane producing reaction proceeds is not limited by this expedient. The reactants and products of the reaction are thermally stable and the temperature at which the reaction is conducted is not critical, although as a matter of convenience, the reaction is conducted at about room temperature.

We have invented a means of moderating the reaction of borohydrides with sulfuric or chlorosulfonic acid so that diborane is produced safely, rapidly and conveniently. Due to the inexpensiveness and availability of sulfuric acid, ease of running the reaction at ordinary temperatures, and the convenience of recovering diborane from the reaction mixture, the above described method of preparing diborane will find valuable use in the production of this high energy fuel. As well as being useful as a high energy fuel, diborane also finds valuable use in vulcanizing rubber, as disclosed in United States Patent No. 2,558,559.

We claim:

1. A method for producing diborane which comprises reacting a protolyzing acid selected from the group consisting of concentrated sulfuric and concentrated chlorosulfonic acid and mixtures thereof with a metal borohydride selected from the group consisting of the alkali and alkaline earth metal borohydrides in the presence of anthraquinone.

2. A method for producing diborane which comprises reacting a protolyzing acid selected from the group consisting of concentrated sulfuric and concentrated chlorosulfonic acid and mixtures thereof with a metal borohydride selected from the group consisting of the alkali and alkaline earth metal borohydrides in the presence of the sodium salt of 2-anthraquinone sulfonic acid.

3. A method of preparing diborane which comprises reacting sodium borohydride with concentrated sulfuric acid in the presence of from about 2% to about 10% sodium 2-anthraquinone sulfonate, by weight of the sulfuric acid.

4. A method of preparing diborane which comprises reacting sodium borohydride with concentrated sulfuric acid in the presence of from about 2% to about 10% anthraquinone, by weight of the sulfuric acid.

References Cited in the file of this patent

UNITED STATES PATENTS

| | | |
|---|---|---|
| 2,513,997 | Gibb | July 4, 1950 |
| 2,543,511 | Schlesinger | Feb. 27, 1951 |
| 2,880,068 | Chiras | Mar. 31, 1959 |

OTHER REFERENCES

Hurd: "Chemistry of the Hydrides," page 162 (1952), pub. by John Wiley & Sons, N.Y.C.

Kilpatrick et al.: "J. Am. Chem. Soc.," vol. 72, pages 5474–5476 (1950).

Wiberg et al.: "Zeitschrift für Naturforschung, vol. 7b, pages 58–59 (1952).

"J.A.C.S.," vol. 75, pp. 186–190, 215–219, 222, January 5, 1953.